United States Patent
Branson et al.

(10) Patent No.: US 9,426,197 B2
(45) Date of Patent: Aug. 23, 2016

(54) COMPILE-TIME TUPLE ATTRIBUTE COMPRESSION

(71) Applicant: International Business Machines Corporation, Amonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 13/867,211

(22) Filed: Apr. 22, 2013

(65) Prior Publication Data

US 2014/0317305 A1    Oct. 23, 2014

(51) Int. Cl.
G06F 15/16 (2006.01)
H04L 29/06 (2006.01)

(52) U.S. Cl.
CPC ............ *H04L 65/602* (2013.01); *H04L 65/608* (2013.01); *H04L 65/80* (2013.01)

(58) Field of Classification Search
CPC ..... H04L 65/60; H04L 65/601; H04L 65/607; H04L 65/605; H04L 65/608
USPC ......................................................... 709/201
See application file for complete search history.

(56) References Cited

U.S. PATENT DOCUMENTS

| | | | |
|---|---|---|---|
| 7,564,847 B2 * | 7/2009 | Li ........................... | H04L 29/06 370/392 |
| 7,613,848 B2 | 11/2009 | Amini et al. | |
| 7,644,110 B2 | 1/2010 | Nishizawa et al. | |
| 7,747,585 B2 | 6/2010 | Barsness et al. | |
| 8,095,690 B2 | 1/2012 | Kashiyama et al. | |
| 8,935,293 B2 | 1/2015 | Park et al. | |
| 9,020,785 B2 * | 4/2015 | Branson ............... | G06F 17/5009 703/2 |
| 9,087,083 B2 * | 7/2015 | Branson ............ | G06F 17/30442 |
| 9,122,726 B2 * | 9/2015 | Branson ............ | G06F 17/30516 |
| 9,135,057 B2 * | 9/2015 | Branson .................... | G06F 9/48 |
| 9,158,784 B2 * | 10/2015 | Branson ............ | G06F 17/30153 |
| 9,158,795 B2 * | 10/2015 | Branson ............ | G06F 17/30516 |
| 9,183,107 B2 * | 11/2015 | Branson ............... | G06F 11/3048 |
| 9,218,395 B2 * | 12/2015 | Barsness ........... | G06F 17/30516 |
| 9,229,965 B2 * | 1/2016 | Barsness ............ | G06F 17/30312 |
| 9,251,205 B2 * | 2/2016 | Branson .................. | H04L 65/60 |
| 9,305,031 B2 * | 4/2016 | Branson ............ | G06F 17/30289 |

(Continued)

OTHER PUBLICATIONS

Rae et al., "IBM InfoSphere Streams", 2009, IBM corporation, all pages.*

(Continued)

*Primary Examiner* — Douglas Blair
(74) *Attorney, Agent, or Firm* — Mark G. Edwards; Feb R. Cabrasawan

(57) ABSTRACT

A method, system, and computer program product for initializing a stream computing application are disclosed. The method may include, during a compiling of code, determining whether an attribute of a tuple to be processed at a first stream operator is to be next processed at a second stream operator. The first stream operator may be configured to transmit the tuple along an execution path to the second stream operator. The execution path includes one or more intervening stream operators between the first and second stream operators. The method may invoke a compression condition when the first attribute of the tuple to be processed at the first stream operator is to be next processed at the second stream operator.

17 Claims, 7 Drawing Sheets

(56) References Cited

U.S. PATENT DOCUMENTS

| | | |
|---|---|---|
| 2003/0158842 A1 | 8/2003 | Levy et al. |
| 2004/0022312 A1 | 2/2004 | Jones et al. |
| 2005/0192978 A1 | 9/2005 | Lightstone et al. |
| 2006/0179238 A1 | 8/2006 | Griswell et al. |
| 2008/0133456 A1 | 6/2008 | Richards et al. |
| 2008/0162523 A1 | 7/2008 | Kraus et al. |
| 2009/0043734 A1 | 2/2009 | Barsness et al. |
| 2010/0011012 A1 | 1/2010 | Rawson |
| 2011/0302226 A1 | 12/2011 | Abadi et al. |
| 2012/0218268 A1 | 8/2012 | Accola et al. |
| 2014/0040915 A1* | 2/2014 | Chen et al. .................... 718/107 |
| 2014/0215184 A1* | 7/2014 | Branson et al. ................. 712/30 |
| 2014/0278338 A1* | 9/2014 | Kozloski et al. ............... 703/22 |
| 2014/0280128 A1* | 9/2014 | Branson et al. ............... 707/736 |
| 2014/0317148 A1* | 10/2014 | Branson et al. ............... 707/798 |
| 2015/0271236 A1* | 9/2015 | Chen et al. .................... 709/200 |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

Branson et al., "Runtime Tuple Attribute Compression", filed Apr. 22, 2013. U.S. Appl. No. 13/867,169.

Santosuosso et al., "Management System for Processing Streaming Data", Filed Jul. 26, 2011. U.S. Appl. No. 13/190,810.

"IBM InfoSphere Streams Version 3.2.1: Toolkits: SPL standard toolkit: Utility Operators: Compress", retrieved on Nov. 4, 2015, 2 pages. https://www-01.ibm.com/support/knowledgecenter/SSCRJU_3.2.1/com.ibm.swg.im.infosphere.streams.spl-standard-toolkit-reference.doc/doc/compress.html.

Branson et al., "Runtime Tuple Attribute Compression," U.S. Appl. No. 15/067,911, filed Mar. 11, 2016.

* cited by examiner

COMPILE-TIME TUPLE ATTRIBUTE COMPRESSION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

In one embodiment, a method to initialize a stream computing application is described. The method may include initializing a stream computing application for execution on one or more compute nodes which are adapted to execute one or more stream operators. The method may, during a compiling of code, determine whether an attribute of a tuple to be processed at a first stream operator is to be next processed at a second stream operator. The first stream operator may be configured to transmit the tuple along an execution path to the second stream operator. The execution path includes one or more intervening stream operators between the first and second stream operators. The method may invoke a compression condition when the first attribute of the tuple to be processed at the first stream operator is to be next processed at the second stream operator.

In another embodiment, a system for initializing a stream computing application is described. The system may include one or more processors and a memory that may contain a program which may be configured to initialize a stream computing application for execution on one or more compute nodes. The system may, during a compiling of code, determine whether an attribute of a tuple to be processed at a first stream operator is to be next processed at a second stream operator. The first stream operator may be configured to transmit the tuple along an execution path to the second stream operator. The execution path includes one or more intervening stream operators between the first and second stream operators. The system may invoke a compression condition when the first attribute of the tuple to be processed at the first stream operator is to be next processed at the second stream operator.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
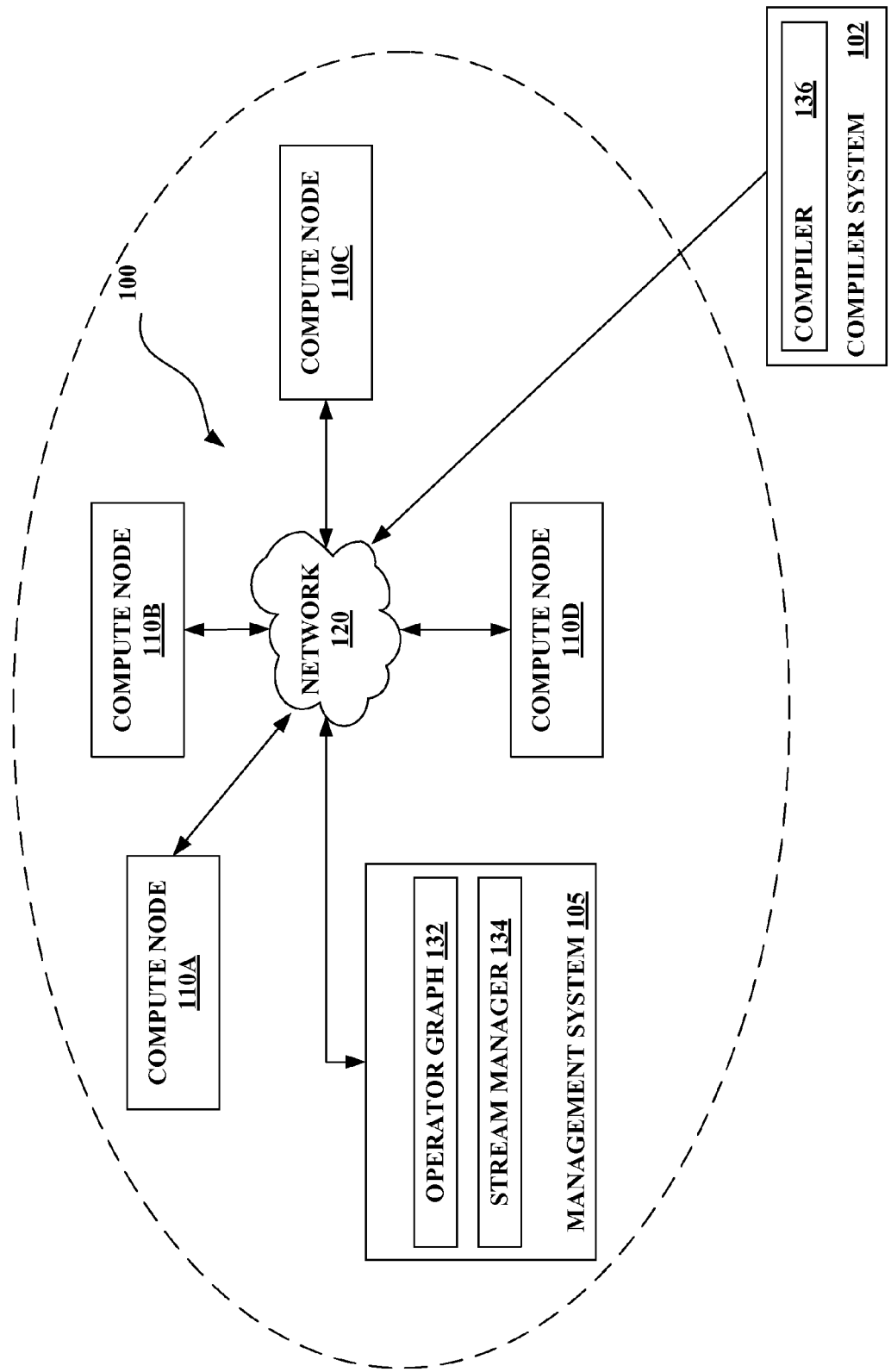
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Tuples are received and output by processing elements. A tuple corresponding with a particular entity, i.e., a particular piece of data, received by a processing element, however, is generally not considered to be the same tuple that is output downstream, even if it corresponds with the same entity or data. Typically, the output tuple is changed in some way by the processing element. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Embodiments of this disclosure are directed to a method and apparatus that may enhance the ability of a stream computing application to efficiently and rapidly process a received data stream. In one embodiment, the method may identify tuple attributes and their corresponding usage throughout the stream computing application at compile-time. Identifying the tuple attributes and their usage throughout the stream computing application may include determining whether an attribute is processed at a stream operator. If a tuple attribute is to be processed at a first stream operator and next processed at a second stream operator, the first stream operator configured to transmit tuples along an execution path that includes one or more intervening stream operators, the tuple attribute may be compressed. This may improve the performance of the stream computing application by reducing the size of a tuple as it is transmitted.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
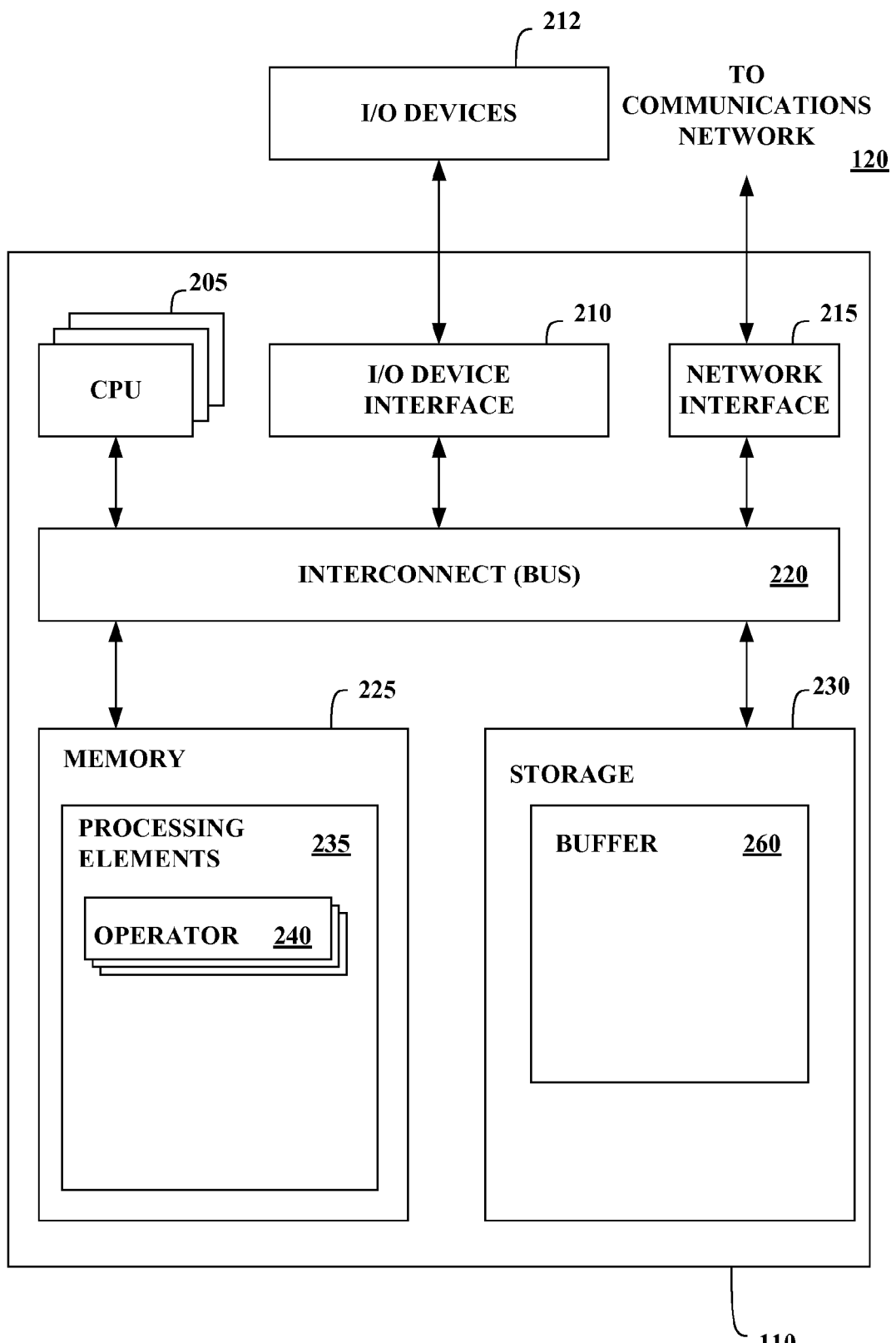
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
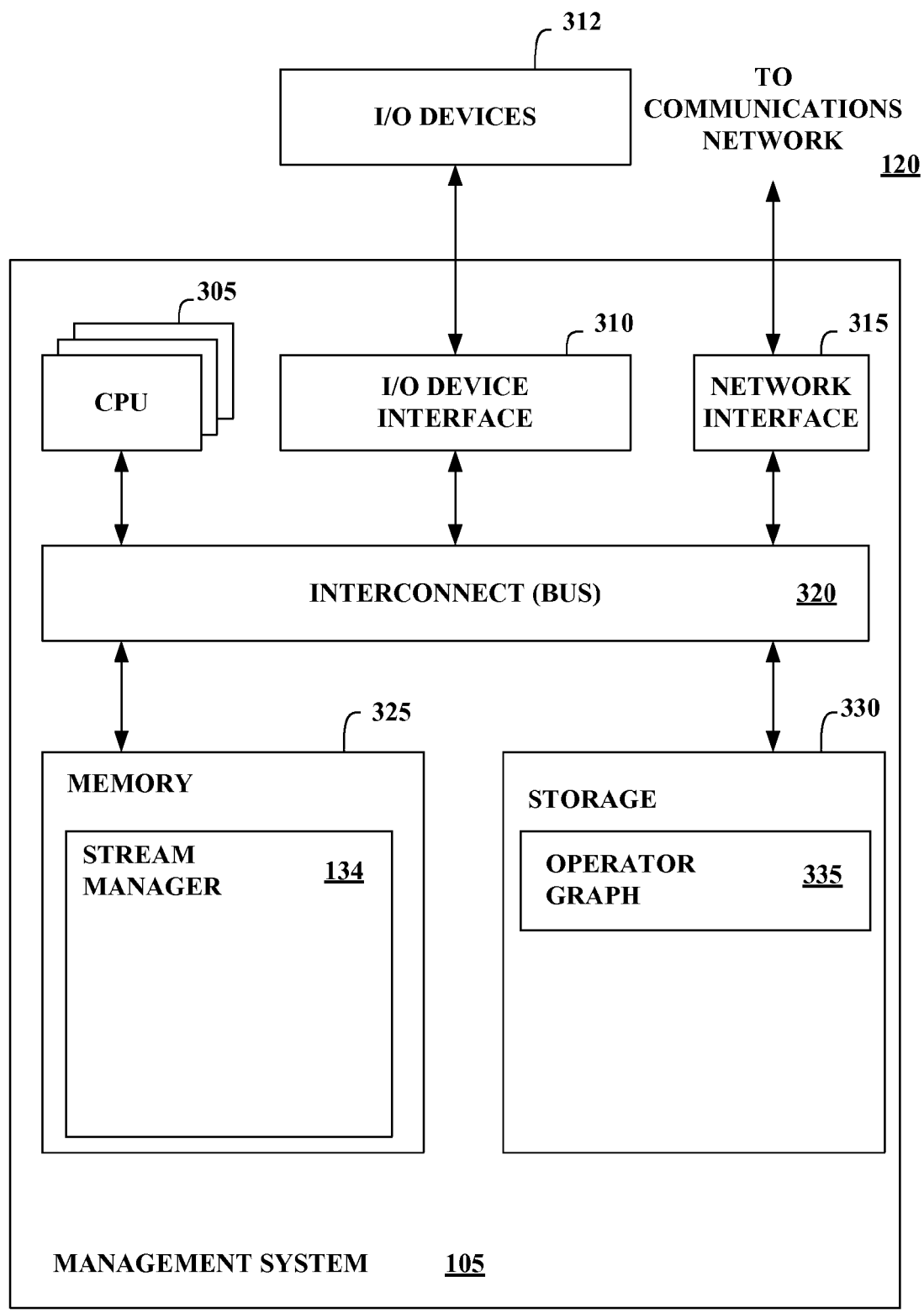
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud.

The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

Figure 4:
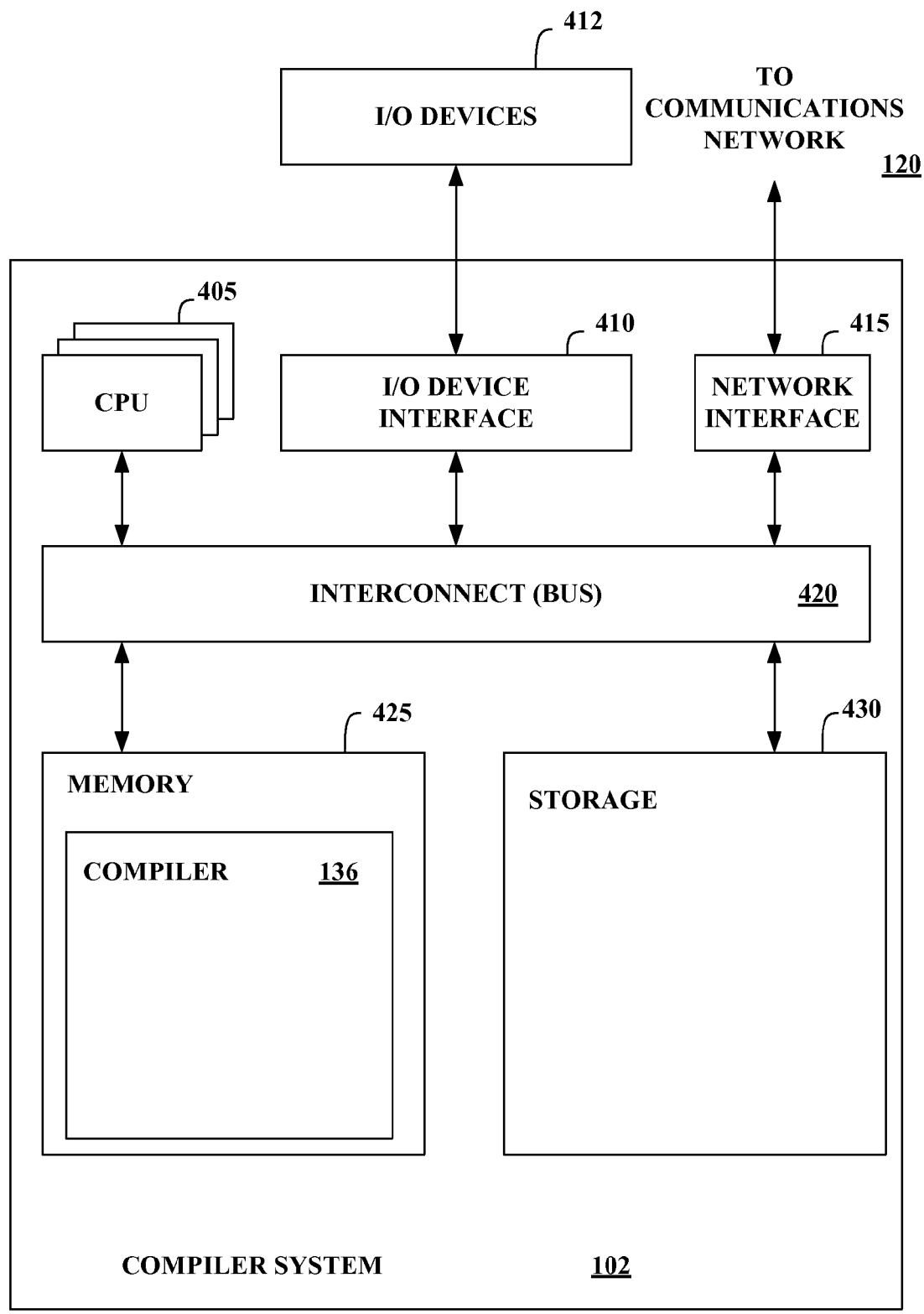
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
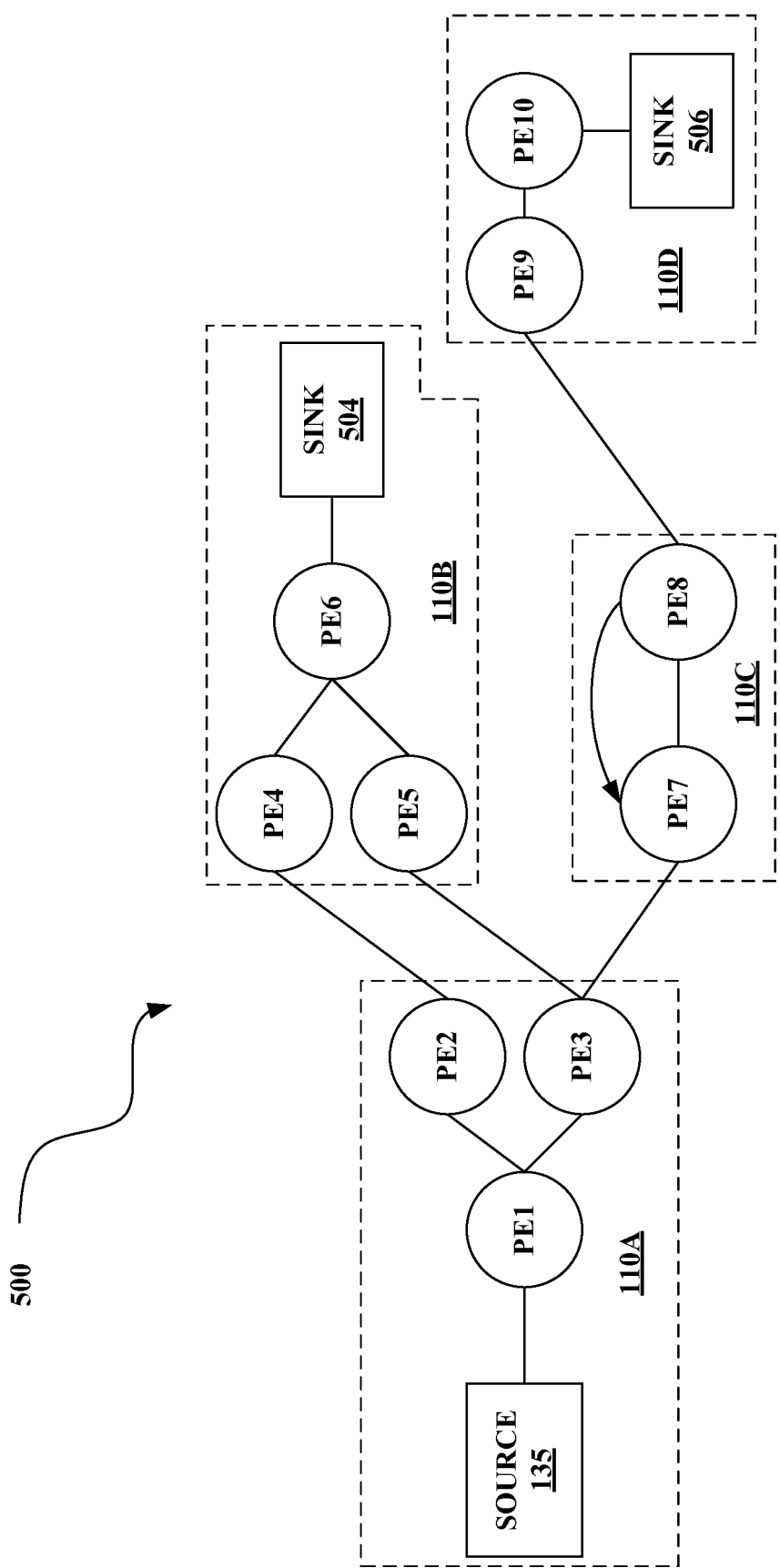
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
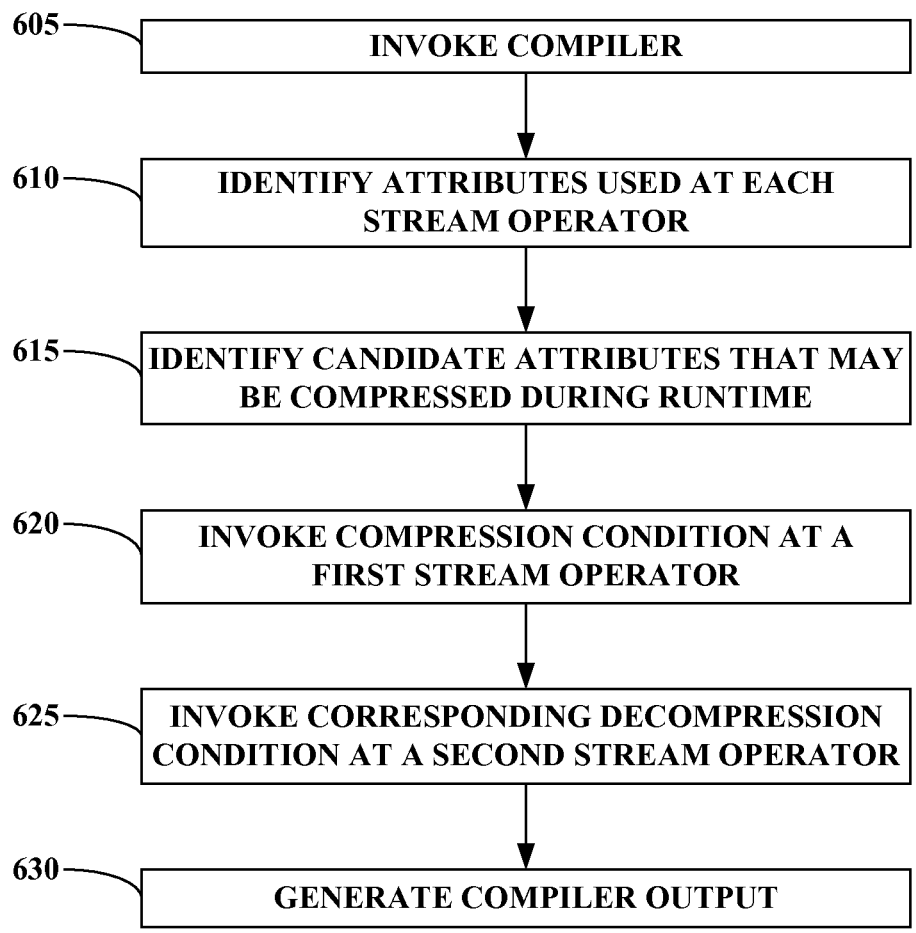
FIG. 6 illustrates a flowchart for a method to invoke a compression condition at a stream operator for a tuple attribute at compile-time, according to various embodiments.

FIG. 6 illustrates a flowchart for a method 600 to invoke a compression condition at a stream operator for a tuple attribute at compile-time, according to various embodiments. The operations of the method 600 may identify tuple attributes and their usage throughout a stream computing application. The method 600 may include determining which tuple attributes are processed at a particular stream operator and whether there are attributes that will not be processed by at least one intervening stream operator. An intervening stream operator may include one or more stream operators that examines or evaluates a tuple attribute without processing the tuple attribute. For example, a first attribute of a tuple may be processed at a first stream operator and then next processed at a second stream operator, but not by one or more intervening stream operators. In this scenario, the method 600 may include invoking a compression condition so that the first attribute may be compressed during runtime execution of the stream computing application. In some embodiments, the method 600 may invoke a decompression condition at the second stream operator to decompress the first attribute during runtime execution of the stream computing application. In other embodiments, the method 600 may invoke a decompression condition that will ensure the first attribute is decompressed prior to processing by the second stream operator.

The method 600 may begin at operation 605, in which a compiler, e.g., compiler 136 (FIG. 4), is invoked, according to some embodiments. During compiling, at operation 610, the compiler 136 may identify the configuration of the stream computing application, including how the various tuple attributes will be processed throughout the stream computing application. This may include identifying the stream operators at which the tuple attributes will be processed throughout the stream computing application. In some embodiments, the compiler 136 may examine each stream operator and maintain a list of tuple attributes that may be processed by that particular stream operator. This may include all attributes of a tuple that may be processed by the particular stream operator regardless of whether a condition exists that must be met in order for the tuple attribute to actually be processed. In other embodiments, the compiler 136 may examine the expected tuple attributes and identify the stream operators at which each tuple attribute will be processed. The compiler 136 may use the processing configuration to generate a map indicating how each tuple attribute will be processed throughout the stream computing application, including when a tuple attribute will be processed and when that same tuple attribute will be exempt from processing. The generated mapping may be output by the compiler 136 for the stream manager 134 to access during runtime execution of the stream computing application. A more detailed example of a sample operator graph for a stream computing application is discussed in further detail in accordance with FIG. 7 below.

At operation 615, the compiler 136 may identify tuple attributes which are candidate attributes for compression, according to some embodiments. An attribute is a candidate attribute for compression if it is processed at a first stream operator and next processed at a second stream operator, but not processed by one or more intervening stream operators. The compiler 136 may use the attribute map generated by operation 610 to determine which tuple attributes are candidate attributes for compression. In some embodiments, the candidate attributes for compression may be flagged by the compiler 136 so that they can be monitored during the runtime execution of the stream computing application.

At operation 620, the compiler 136 may invoke one or more compression conditions at the identified stream operators, according to some embodiments. Invoking a compression condition may include adding or enabling a compression condition. For example, if an application programmer provided a compression condition for a tuple attribute at a first stream operator, the compiler 136 may ensure that the application programmer's compression condition is enabled and will operate during runtime execution of the stream computing application. In other embodiments, the compiler 136 may add a compression condition to the first stream operator at operation 620. In some embodiments, the compiler 136 may add the compression condition to one of the intervening stream operators. In other embodiments, the compiler 136 may add a stream operator that is configured to compress the attribute after processing by the first stream operator.

Operation 620 may additionally include one or more operations that determine a compression technique to be invoked, according to some embodiments. For example, the operation 620 may include a determination of one or more characteristics of the corresponding tuple attribute, such as the type of the attribute that is going to be compressed by the stream operator. In some embodiments, the type of the attribute may provide criteria for selecting a lossy or lossless compression technique. The type of the attribute may also determine the technique selected from within the larger category of lossy or lossless compression. In some embodiments, the preferred compression techniques may be provided by the system, but are capable of being overridden by an application programmer. The attribute characteristics may also impact a configurable compression factor, which may also be system provided but capable of being overridden by the application programmer.

At operation 625, the compiler 136 may invoke one or more decompression conditions at the stream operator where the compressed attribute is next processed, according to some embodiments. In some embodiments, the compiler 136 may invoke one or more decompression conditions at an intervening stream operator so that the compressed attribute is decompressed prior to processing at the second stream operator. Invoking a decompression condition may include adding or enabling a decompression condition. For example, if an application programmer provided a decompression condition corresponding to a compression condition at a second stream operator, the compiler 136 may ensure that the application programmer's condition is enabled and will operate during runtime execution of the stream computing application. In other embodiments, the compiler 136 may add a decompression condition corresponding to a compression condition at a second stream operator. The decompression condition invoked in operation 625 may include a decompression technique that corresponds to the compression technique in the corresponding compression condition that was invoked in operation 620.

At operation 630, after identifying candidate attributes for compression, the compiler 136 generates a set of deployable artifacts, according to some embodiments. The deployable artifacts may include an application description language file (ADL file) and object code from the source code input, according to some embodiments. The object code may include a set of processing elements to be executed on the one or more compute nodes. In other embodiments, the compiler 136 may translate the modules into an intermediate form before translating the intermediate form into object code (described in additional detail above).

Figure 7:
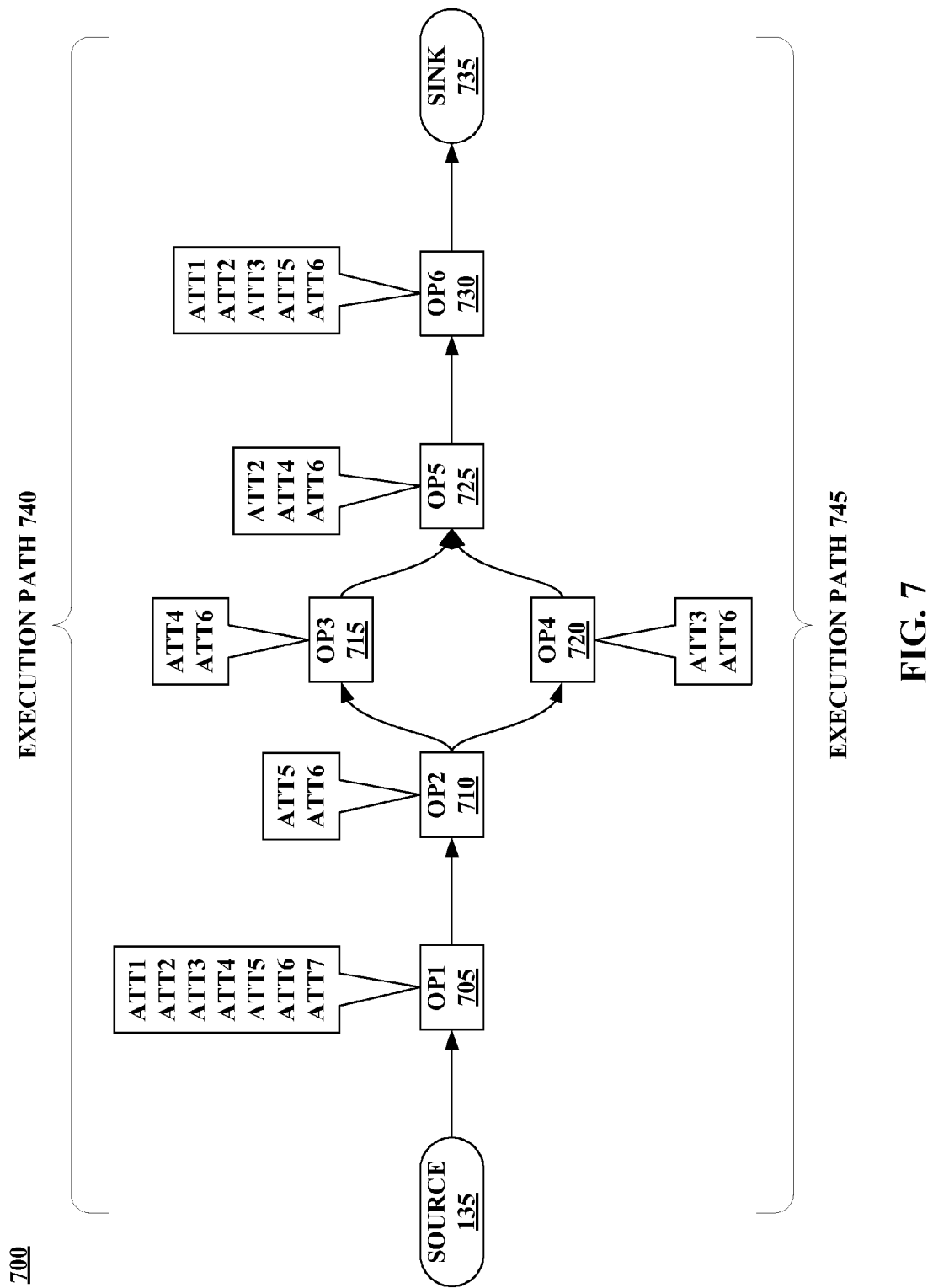
FIG. 7 illustrates an operator graph including a listing of each attribute that is to be processed by the particular stream operators, according to various embodiments.

FIG. 7 illustrates an operator graph 700 including a listing of each attribute that is to be processed by the particular stream operators, according to some embodiments. The operator graph 700 illustrates simplified execution paths for illustrative purposes.

The operator graph 700 contains a source 135, six stream operators 705, 710, 715, 720, 725, and 730, and a sink 735. Other embodiments may include additional stream operators and/or additional execution paths. The operator graph 700 includes two potential execution paths: execution path 740 starts at the source 135, and proceeds from stream operator 705 to 710 to 715 to 725 to 730 and ends at sink 735; execution path 745 starts at the source 135 and proceeds from stream operator 705 to 710 to 720 to 725 to 730 and ends at sink 735. In the illustrated embodiment, the two execution paths 740, 745 complete slightly different processing, as illustrated by the stream operators 715 and 720 processing different attributes. In other embodiments, the execution paths may be configured to process the same attributes as a way of load balancing the processing in the stream computing application.

The execution path 740 begins with a source 135. The source provides the stream of tuples to the stream operator 705. The stream operator 705 is configured to process attributes ATT1, ATT2, ATT3, ATT4, ATT5, ATT6, and ATT7. After processing, the stream operator 705 may transmit a tuple to stream operator 710. The stream operator 710 is configured to process attributes ATT5 and ATT6 and to transmit the resulting tuple to stream operator 715. The stream operator 715 is configured to process attributes ATT4 and ATT6 and to transmit the resulting tuple to stream operator 725. The stream operator 725 is configured to process attributes ATT2, ATT4, and ATT6 and to transmit the resulting tuple to stream operator 730. The stream operator 730 is configured to process attributes ATT1, ATT2, ATT3, ATT5, and ATT6 and to transmit the resulting tuple to sink 735.

The method 600 (FIG. 6) may identify the stream operators and the attributes processed by each stream operator as described above. Based on the processing configuration of execution path 740, the compiler 136 may identify several locations at which compression conditions may be invoked. For example, compression conditions may be invoked at the stream operator 705 to compress attributes ATT1, ATT2, ATT3, and ATT4. The attributes ATT5, ATT6, and ATT7 are not included in the compression conditions because attributes ATT5 and ATT6 are processed by the stream operator 710, and ATT7 is excluded because it is not part of the tuple after the processing at the stream operator 705. The compiler 136 may invoke a decompression condition at the stream operator at which the attributes ATT1-ATT4 are going to again be processed. For example, a decompression condition for ATT1 may be invoked at stream operator 730. The compiler 136 may also invoke compression conditions at stream operator 710 (corresponding to ATT5). The compiler may invoke a decompression condition at stream operators 720 and 730 for ATT3, which, depending on the execution path of the tuple, will be executed accordingly.

The execution path 745 begins with the source 135. The source provides the stream of tuples to the stream operator 705. The stream operator 705 is configured to process attributes ATT1, ATT2, ATT3, ATT4, ATT5, ATT6, and ATT7. After processing, the stream operator 705 may transmit a tuple to stream operator 710. The stream operator 710 is configured to process attributes ATT5 and ATT6 and to transmit the resulting tuple to stream operator 720. The stream operator 720 is configured to process attributes ATT3 and ATT6 and to transmit the resulting tuple to stream operator 725. The stream operator 725 is configured to process attributes ATT2, ATT4, and ATT6 and to transmit the resulting tuple to stream operator 730. The stream operator 730 is configured to process attributes ATT1, ATT2, ATT3, ATT5, and ATT6 and to transmit the resulting tuple to sink 735.

Based on the processing configuration of execution path 745, the compiler 136 may identify several locations at which compression conditions may be invoked. For example, compression conditions may be invoked at the stream operator 705 to compress attributes ATT1, ATT2, ATT3, and ATT4. The attributes ATT5, ATT6, and ATT7 are not included in the compression conditions because attributes ATT5 and ATT6 are processed by the stream operator 710, and ATT7 is excluded because it is not part of the tuple after the processing at the stream operator 705. The compiler 136 may invoke a decompression condition at the stream operator at which the attributes ATT1-ATT4 are going to again be processed. For example, a decompression condition for ATT1 may be invoked at stream operator 730. The compiler 136 may also invoke compression conditions at stream operator 710 (corresponding to ATT5). A stream operator may be configured with both a compression condition and a decompression condition for a particular attribute. For example, the compiler 136 may invoke a decompression condition at stream operator 720 corresponding to ATT3 so that ATT3 may be processed. The compiler 136 may also invoke a compression condition at stream operator 720 corresponding to ATT3, since ATT3 will not be next processed until stream operator 730.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method comprising:
executing a set of tuples with a set of compute nodes, wherein a first tuple of the set of tuples has a set of attributes that has a first attribute of the set of attributes, and wherein each compute node is adapted to execute a set of stream operators;
receiving the first tuple;
determining whether the first attribute to be processed at a first stream operator is to be next processed at a second stream operator, wherein the first stream operator is configured to transmit the first tuple along an execution path including one or more intervening stream operators to the second stream operator; and
compressing the first attribute into a first compressed attribute with a compression condition, in response to determining that the first attribute to be processed at the first stream operator is not to be processed at the second stream operator.

2. The method of claim 1, further comprising:
determining that the first compressed attribute not processed at the second stream operator is to be next processed at a third stream operator, wherein the second stream operator is configured to transmit a tuple along an execution path including one or more intervening stream operators to the third stream operator; and
decompressing the first compressed attribute into the first attribute with a decompression condition in response to determining that the first compressed attribute not processed at the second stream operator is to be next processed at a third stream operator.

3. The method of claim 1, wherein the compression condition operates during runtime of the stream computing application.

4. The method of claim 1, further comprising:
generating a map indicating one or more stream operators at which each attribute of a tuple is to be processed.

5. The method of claim 1, wherein the one or more intervening stream operators is further configured to examine the tuple prior to transmitting the tuple to the second stream operator.

6. The method of claim 1, wherein the compression further comprises:
determining one or more characteristics of the first attribute; and
selecting a first of a plurality of compression techniques, wherein the one or more characteristics of the first attribute identify a preference for lossy or lossless compression.

7. A computer program product, comprising:
a non-transitory computer readable storage medium having program code stored thereon, the program code configured to:
execute a set of tuples with a set of compute nodes, wherein a first tuple of the set of tuples has a set of attributes that has a first attribute of the set of attributes, and wherein each compute node is adapted to execute a set of stream operators;
receive the first tuple;
determine that the first attribute to be processed at a first stream operator is to be next processed at a second stream operator, wherein the first stream operator is configured to transmit the first tuple along an execution path including one or more intervening stream operators to the second stream operator; and
compress the first attribute into a first compressed attribute with a compression condition in response to the determination that the first attribute to be processed at the first stream operator is not to be processed at the second stream operator.

8. The computer program product of claim 7, further comprising:
determine whether the first compressed attribute not processed at the second stream operator is to be next processed at a third stream operator, wherein the second stream operator is configured to transmit a tuple along an execution path including one or more intervening stream operators to the third stream operator; and
decompress the first compressed attribute into the first attribute with a decompression condition in response to the determination that the first compressed attribute not processed at the second stream operator is to be next processed at a third stream operator.

9. The computer program product of claim 7, wherein the compression condition operates during runtime of the stream computing application.

10. The computer program product of claim 7, further comprising:
generating a map indicating a stream operator at which each attribute of a tuple is to be processed.

11. The computer program product of claim 7, wherein the intervening stream operator further configured to examine the tuple prior to transmitting the tuple to the second stream operator.

12. The computer program product of claim 7, wherein the compression further comprises:
determining one or more characteristics of the first attribute; and
selecting a first of a plurality of compression techniques, wherein the one or more characteristics of the first attribute identify a preference for lossy or lossless compression.

13. A system for initializing a stream computing application, comprising:
one or more computer processors; and
a memory containing a program, which when executed by the one or more computer processors is configured to initialize a stream computing application, the initializing comprising:
executing a set of tuples with a set of compute nodes, wherein a first tuple of the set of tuples has a set of attributes that has a first attribute of the set of attributes, and wherein each compute node is adapted to execute a set of stream operators;

receiving the first tuple;

determining whether the first attribute to be processed at a first stream operator is to be next processed at a second stream operator, wherein the first stream operator is configured to transmit the first tuple along an execution path including one or more intervening stream operators to the second stream operator; and compressing the first attribute into a first compressed attribute with a compression condition in response to determining that the first attribute to be processed at the first stream operator is not to be processed at the second stream operator.

14. The system of claim 13, further comprising;

determining whether the first compressed attribute not processed at the second stream operator is to be next processed at a third stream operator, wherein the second stream operator is configured to transmit a tuple along an execution path including one or more intervening stream operators to the third stream operator; and decompressing the first compressed attribute into the first attribute with a decompression condition in response to determining that the first compressed attribute not processed at the second stream operator is to be next processed at a third stream operator.

15. The system of claim 13, further comprising:

generating a map indicating a stream operator at which each attribute of a tuple is to be processed.

16. The system of claim 13, wherein the intervening stream operator further configured to examine the tuple prior to transmitting the tuple to the second stream operator.

17. The system of claim 13, wherein the compression further comprises:

determining one or more characteristics of the first attribute; and selecting a first of a plurality of compression techniques, wherein the one or more characteristics of the first attribute identify a preference for lossy or lossless compression.

* * * * *